Dec. 10, 1963    M. F. AMSTERDAM    3,114,041
COOLED INFRARED RADIATION DETECTOR
Filed Jan. 11, 1961
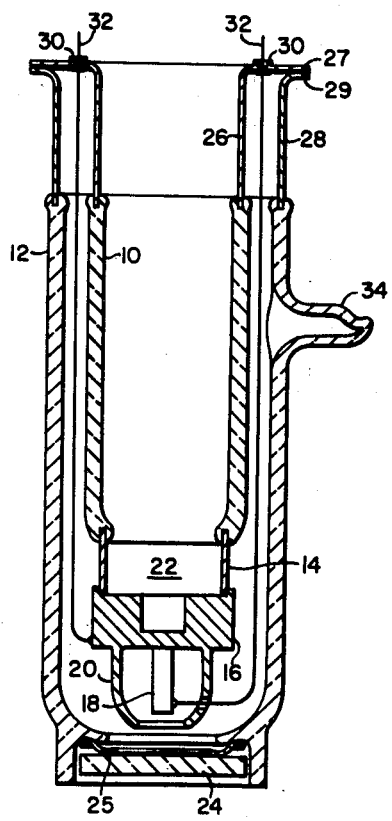
WITNESSES
INVENTOR
Michael F. Amsterdam
BY
Charles F. Renz
ATTORNEY

United States Patent Office 3,114,041
Patented Dec. 10, 1963

3,114,041
COOLED INFRARED RADIATION DETECTOR
Michael F. Amsterdam, Greensburg, Pa., assignor to Westinghouse Electric Corporation, East Pittsburgh, Pa., a corporation of Pennsylvania
Filed Jan. 11, 1961, Ser. No. 82,024
3 Claims. (Cl. 250—83)

This invention relates to structures and methods of assembly of cooled devices for radiation detection and, more particularly, to the structure and method of assembly of a dewar vessel for holding and cooling radiation detector elements such as those used for the detection of infrared radiation.

While the present invention will be particularly described in conjunction with infrared radiation detection devices, it is to be expressly understood that the teachings of the present invention are applicable to detectors of any sort of radiation which for satisfactory operation require cooling below ambient temperatures such as down to liquid nitrogen temperature.

Detection of infrared radiation in the range from about 2 microns to 10 microns has been successfully achieved with impurity doped semiconductors such as germanium. The presence of the impurity atoms causes an extrinsic photoconductive response to radiation whose long wave length threshold depends on the type of impurity in the semiconductor. Since a relatively small amount of energy is required for carrier excitation in impurity doped semiconductors, many free charge carriers may be produced merely by reason of the detector being at room temperature. Hence, the signal to noise ratio of such a device is very low unless cooling is provided sufficient to make the number of thermally excited carriers small. As a result, various means of cooling have been adopted or proposed for such detector elements one of the most popular of which is the use of a liquid coolant such as liquid nitrogen or possibly liquid helium. It has been found almost essential that the temperature of the detector element be reduced to at least liquid nitrogen temperature.

Well known detector assemblies which are designed to use a liquid coolant generally comprise a dewar vessel which provide a thermally insulated container to hold the liquid coolant or a cryostat to continuously circulate the coolant. A portion of the inner shell of the dewar vessel at the base thereof is of a thermally conductive material such as a metal on which is mounted, in the space between the inner and outer shells, the infrared radiation detector element. In this manner, the liquid coolant can maintain the detector element at the requisite temperature. At the base of the outer shell there is provided an infrared radiation transmissive window to permit infrared radiation to impinge upon the detector element.

Such dewar vessels are generally assembled by beginning with the inner and outer shells joined together at the mouth of the vessel but open at the base. The detector mounting is then sealed to the base of the inner shell and the window assembly is then sealed to the base of the outer shell. While this is generally a straight forward method of assembly, great care must be exercised to insure that each step is properly carried out because a single improper operation can require that the entire device be discarded. This results from the fact that this type of assembly does not permit any substantial disassembly in the event an operation is not successfully performed. For example, the sealing of the window assembly to the outer shell requires great care because, if thermal stresses are not adequately compensated for, the window member is likely to crack.

If, for example, the heliarc welding operation by which the window assembly is joined to the dewar vessel caused the window to crack, as is possible when the gas stream is not directed properly during welding, it is not found possible to cut off the weld and re-weld with another window assembly. Too great a portion of the flange in the window assembly is usually welded so that any remaining flange width if it were possible to cut off the weld would be insufficient to form a thermal barrier isolating the welding heat from the window. Therefore, if the window cracks the only salvageable parts are relatively minor in expense. Furthermore, the cost of the window member itself is sufficiently great to make it highly desirable to provide a method of assembly in which the danger of cracked windows is substantially reduced.

Since the inner surfaces of the dewar vessel shells are silvered in order to reflect radiation, other disadvantages are encountered in the prior art method of making the detector assembly. It is often necessary that after the detector element and its mount have been sealed to the inner shell member, the detector element must be subjected to chemical etching operations in order to clean foreign material off its surface prior to the sealing of the window assembly. Such etching operations are difficult to perform without some of the etchant splattering onto the inner surface of the outer shell and attacking the silvering located there. It is also desirable that it be possible to remove the silvering from that portion of the outer shell on which the getter is located so that the getter may be viewed for proper location of the RF heater during bake out and flashing and so that the heat applied by RF heating or the like will not travel throughout the coating of silvering and heat the entire device.

Therefore it is an object of the present invention to provide an improved assembly, and method of making the same, for a cooled radiation detector.

Another object is to provide an improved dewar vessel, and method of making the same, for holding and cooling the radiation detector.

Another object is to provide an assembly for a liquid cooled radiation detector which permits disassembly and reassembly without substantial damage to the component parts.

Another object is to provide a dewar vessel for holding and cooling the radiation detector which may be fabricated in separate operations on the inner and outer shell members which are then joined to complete the assembly and may be disassembled when desired without harm to the detector element, the window or other component parts.

According to one feature of the present invention, a dewar vessel for holding and cooling a radiation detector is provided wherein the inner and outer shells are of separate insulating members joined together at the mouth of the vessel by members sealed to each of the insulating members and to each other in vacuum tight seals. At any stage of the processing or after complete assembly it is possible to separate the inner and outer shell members by breaking the seal between the metallic members without requiring heating sufficient to damage the detector element or other components.

According to other features of the invention, the infrared transmissive window is sealed directly to the insulating member of the outer shell merely by using a single metal member between them so that it is unnecessary to employ a complicated window assembly requiring welding.

The features of the present invention which are believed to be novel are set forth with particularity in the appended claims. The present invention, both as to its structure and method of assembly, together with the above mentioned and further objects and advantages thereof, may best be understood by reference to the following description, taken in connection with the accompanying drawing, in which the single FIGURE is a cross sectional view showing a radiation detector assembly employing the teachings of the present invention.

Referring to the single figure, there are shown two members 10 and 12 of a thermally insulating material such as glass having a configuration of concentric circular cylinders which make up, respectively, the inner and outer shells of the dewar vessel which comprises a major structural portion of the detector assembly. To the base portion of the inner shell 10 there is sealed a cylindrical metallic member 14, of a material such as Kovar, a cobalt-nickel-iron alloy having a coefficient of thermal expansion substantially equal to that of glass, in turn has joined to it a block 16 of conductive material, such as copper, on which is disposed the radiation detector element 18 surrounded by an integrating dome 20 of a material such as silver. The structure comprising the elements just mentioned will be collectively referred to herein as the detector element assembly 22. It is of course possible that other mount configurations be employed within the scope of this invention.

The outer shell 12 has sealed to its base an infrared radiation transmissive window 24 of a material such as barium fluoride which may be sealed directly to the outer shell 12 by a suitable sealant such as silver chloride. As shown in the drawing, a metallic spinning 25 of a material such as silver, for example, is preferably used between the window 24 and the outer shell 12 in order to provide uniform heat distribution to insure that the window 24 will not crack. This window assembly requires no welding substantially reducing the danger of window cracking, and is preferred for that reason.

Members 26 and 28 of a cylindrical configuration are sealed to the extremity of each of the shell members 10 and 12. Each of the sealing or metallic members 26 and 28, which may be of a material having a coefficient of thermal expansion substantially equal to that of glass such as Kovar, has outwardly extending portions 27 and 29 which are joined together to form a vacuum tight seal by soft solder techniques or heliarc welding. The inner metallic member 26 is provided with small apertures in the flared-out portion 27 having insulating members 30 therein to permit the passage of electrical leads 32 connected to the copper block 16 of the detector mount 22 and to the detector element 18.

The detector assembly illustrated in FIG. 1 may be formed by separately assembling all of the components on the inner and outer shells 10 and 12 and then placing the inner shell 10 within the outer shell 12 and joining together the metallic members 27 and 29 at the mouth of the dewar vessel. For example, the detector element assembly 22 comprising the infrared radiation detector and the mount therefor are joined to the base portion of the inner shell 10 after which whatever processing may be desired such as chemical etching may be performed without any damage to other components. The specific techniques used for these operations may be conventional. Separately, the window 24 is joined to the outer shell 12 either in the form shown or in other more complicated structures if found desirable. The metallic members 26 and 28 are also sealed to each of the inner and outer shells 10 and 12 while they are separate. Then the inner shell 10 with the detector element assembly 22 thereon is inserted within the outer shell 12 and the metallic elements 26 and 28 are sealed together. The region between the inner and outer shells 10 and 12 may then be evacuated through the tubulation 34 and sealed off. If at any time the device is inoperable due to faulty processing, for example, if a leak in the exhaust tubulation develops during the seal off the assembly may be disassembled. The seal between the metallic members 26 and 28 is formed either by soft soldering or by a heliarc weld, either of which may be unsealed or cut open. This does not incur substantial danger to the detector element 18 or window 24 because of the remoteness of the seal. On the other hand, if a glass seal is formed directly between the two insulating members 10 and 12, such high temperature is required for disassembly that it cannot be practicably done.

While the shells 10 and 12 are separated it is of course possible to make any modifications in the silvering thereon for any purpose desired such as making the getter element visible in order to properly locate the RF heater used to flash it and prevent heating of the entire coating of silver.

It is therefore seen that by modifications in fabrication which are of relatively simple accomplishment, substantial savings can be achieved in the assembly of infrared detectors, for example, by reducing the danger of damage to the infrared transmissive window during processing to a negligible level. Also, considerable fabrication time and expense is saved in this manner.

While the present invention has been shown and described in certain forms only, it will be obvious to those skilled in the art that it is not so limited but is susceptible of various changes and modifications without departing from the spirit and scope thereof.

I claim as my invention:

1. An infrared radiation detector assembly comprising a dewar vessel having an inner shell comprising a first thermally insulating member in cylindrical form, an outer shell comprising a second thermally insulating member in cylindrical form substantially coaxial with said first thermally insulating member, said first and second thermally insulating members each having a first extremity in a common plane perpendicular to the axis of said members, a block of conductive material secured to the other extremity of said first thermally insulating member, an infrared radiation detector element disposed on said block, a first conductive lead member in contact with said block and a second conductive lead member in contact with said detector element, said insulating members each having a metallic member joined thereto in a vacuum tight seal at the first extremity thereof, said metallic members joined together in a vacuum tight seal at the mouth of said vessel, said first and second lead members each passing through an aperture in one of said metallic members.

2. A dewar vessel for holding and cooling a radiation detector, said vessel having an outer shell and an inner shell each comprising a tubular thermally insulating member, each thermally insulating member having a first extremity in a common plane perpendicular to said members, said insulating members each having joined to said first extremity a tubular metallic member, said metallic members having flange portions extending radially outward joined together in a vacuum tight seal at the mouth of said vessel, the metallic member of said inner shell having two apertures with insulating members therein to permit the passage of electrical leads therethrough, and an infrared radiation transmissive window sealed to the thermally insulating member of said outer shell by a metallic spinning which uniformly distributes heat to said window.

3. An infrared radiation detector assembly comprising a dewar vessel having an inner shell comprising a first glass member in cylindrical form, an outer shell comprising a second glass member in cylindrical form substantially coaxial with said first glass member, said first and second glass members each having a first extremity in a common plane perpendicular to the axis of said members, a first cylindrical metallic member sealed to the other extremity of said first glass member, a block of conductive material joined to said first metallic member, an infrared radiation detector element disposed on said block, second and third cylindrical metallic members each joined to said first extremity of one of said glass members in a vacuum tight seal, said second and third metallic members having flange portions extending radially outward joined together in a vacuum tight seal at the mouth of said vessel, an infrared radiation transmissive window sealed to said second glass member at the extremity thereof near said infrared radiation detector element, a pair of electrical leads extending from said detector element and from said block of conductive material through the space between said inner and outer shells and through electrical insulating members within the flange portion of the metallic member of said inner shell.

References Cited in the file of this patent

UNITED STATES PATENTS

| | | |
|---|---|---|
| 2,951,944 | Fong | Sept. 6, 1960 |
| 2,973,434 | Roberts | Feb. 28, 1961 |
| 2,980,763 | Lasser | Apr. 18, 1961 |
| 3,018,643 | Evers | Jan. 30, 1962 |